(12) United States Patent
Mostovoy et al.

(10) Patent No.: US 7,684,218 B2
(45) Date of Patent: Mar. 23, 2010

(54) METHOD AND DEVICE FOR TRANSFORMING AND REGULATING A VOLTAGE SIGNAL

(76) Inventors: Alexander Mostovoy, 2 Aseret Hashvatim, Ashqelon (IL) 78680; Victor Shlyakhetsky, 3 Ben Atar, Ashqelon (IL) 78309; Tsvika Moalem, 10 Hagdud Haevry, P.O. Box 1042, Ashqelon (IL) 78109

( * ) Notice: Subject to any disclaimer, the term of this patent is extended or adjusted under 35 U.S.C. 154(b) by 277 days.

(21) Appl. No.: 11/667,382

(22) PCT Filed: Nov. 10, 2005

(86) PCT No.: PCT/IL2005/001187
§ 371 (c)(1),
(2), (4) Date: Nov. 29, 2007

(87) PCT Pub. No.: WO2006/051540
PCT Pub. Date: May 18, 2006

(65) Prior Publication Data
US 2008/0186744 A1     Aug. 7, 2008

Related U.S. Application Data

(63) Continuation-in-part of application No. PCT/IL2005/001187, filed on Nov. 10, 2005.

(30) Foreign Application Priority Data
Nov. 10, 2004    (IL)    ...................................... 165142

(51) Int. Cl.
*H02M 5/45* (2006.01)
*H02M 7/155* (2006.01)

(52) U.S. Cl. ............................ 363/37; 363/52; 363/130
(58) Field of Classification Search ................... 363/22, 363/24, 31, 34, 37, 51–53, 55, 56.01, 56.02, 363/56.06, 67, 71, 98, 130, 131, 133, 139; 336/180–183
See application file for complete search history.

(56) References Cited

U.S. PATENT DOCUMENTS

| | | | |
|---|---|---|---|
| 6,346,778 B1 | 2/2002 | Mason et al. | |
| 6,356,462 B1 * | 3/2002 | Jang et al. | ...................... 363/17 |
| 6,728,116 B2 * | 4/2004 | Bae | ............................. 363/20 |
| 6,784,708 B1 | 8/2004 | Krenzke | |
| 2003/0063480 A1 * | 4/2003 | Morita et al. | .................. 363/37 |
| 2004/0004449 A1 | 1/2004 | Suzuki et al. | |
| 2006/0011595 A1 | 1/2006 | Daniel et al. | |

* cited by examiner

*Primary Examiner*—Jessica Han
*Assistant Examiner*—Emily Pham
(74) *Attorney, Agent, or Firm*—Nixon & Vanderhye P.C.

(57) ABSTRACT

The present invention is generally directed to an efficient voltage transforming and regulating device based on a High Frequency (HF) transformer and a HF Electromagnetic Voltage Regulator (HFEVR) serially connected to the transformer's coil(s). The transforming and regulating device of the invention efficiently transforms and stabilizes an input power source without requiring filtering stages. The regulation of a voltage signal according to the present invention is carried out by utilizing one or more HFEVRs of the invention which comprise a coil magnetically coupled to an electromagnet, wherein said HFEVRs are connected to the primary and/or secondary coil(s) of a voltage transformer via their coils, and wherein the voltage over the primary and/or secondary coil(s) of said transformer is regulated by adjusting the value of the reactive resistance of said coils of said HFEVRs by suitable control signal provided to the their electromagnets.

19 Claims, 11 Drawing Sheets

METHOD AND DEVICE FOR TRANSFORMING AND REGULATING A VOLTAGE SIGNAL

This application is a U.S. continuation-in-part of international application PCT/IL2005/001187 filed 10 Nov. 2005, which designated the U.S. and claims benefit of IL 165142 filed 10 Nov. 2004, the entire contents of each of which are hereby incorporated by reference.

FIELD OF THE INVENTION

The present invention relates to a method and device for transforming and regulating a voltage signal. More particularly, the present invention relates to a method and device for efficiently transforming a voltage signal and regulating the same by adjusting a reactive resistance of a voltage regulator.

BACKGROUND OF THE INVENTION

Transformation of continuous alternating voltage (e.g., sinusoidal voltage) is typically carried out by utilizing closed circuit magnetic core transformers and electrical inductive (e.g., coils) elements. These transformation techniques suffers from the large weight and size of the transformers (typically up to 10 kG per one kW of transformed power), and from the difficulties associated with starting the transformers (the initial current in the transformer's primary coil may exceed the operating current by a factor of 6 to 8). Other drawbacks of these transformation techniques are due to the absence of protection against short circuit currents and due to the difficulties in gradually changing their output voltage in a continuous fashion.

According to another conventional voltage transformation scheme High Frequency (HF) transformers are utilized, the weight of which is typically in the range of 1.5 to 2 kG per 1 kW of transformed power. However, the transformation methods realized utilizing these transformers are complex due to the necessity to rectify and regulate the alternating current, and due to the filtering stages, required to assure that at any given time the converted voltage does not exceeds the required voltage. In addition, these transformation techniques often requires sophisticated control means for adjusting the shape of the output voltage to correspond to the shape of the input power source. Moreover, in these transformation techniques the voltage of the alternating power source is usually modulated by a HF rectangular or stepped pulse signal, which narrows the scope of applications that can employ these techniques, since most AC electrical appliances cannot effectively function when powered by a non-sinusoidal voltage.

Heretofore power conversion schemes were mainly based on PWM (Pulse Width Modulation) techniques wherein the power delivered to a load is controlled by a switching device being toggled between its open (disconnect—"OFF") and close (connect—"ON") states, wherein the delivered power is determined by the ratio between the time periods of the OFF and ON states of the switching device. These conversion schemes are efficient in terms of power efficiency, however, they suffer from various disadvantages such as emission of undesirable electromagnetic radiation and distortions in the converted signal due to presence of noises and redundant harmonies.

U.S. Pat. No. 6,346,778 (to Murray Mason et al.,) describes an AC (Alternating Current) power converter capable of adapting its output to capacitive, inductive, and/or resistive loads by utilizing a switching device the operation of which is controlled by a controller that regulates the power delivered to the output load according to the voltage and current inputs and their phase differences, which allows dissipating residual energy in the power converter.

U.S. Pat. No. 6,784,708 (to Rainer Krenzke) describe a high voltage output driver for a variable voltage range based on slew rate sensing. This driver comprises a slope transformer, a differentiator, a regulator, comparator, and a digital regulator which are connected together in a closed loop. While this converter is capable of providing stabilized adjustable output voltages, it is complex and costly.

The methods described above have not yet provided satisfactory solutions to the problems of the prior art. Therefore there is a need for an efficient and simplified transforming and regulating device that overcomes the above mentioned problems.

It is therefore an object of the present invention to provide an efficient adjustable and relatively lightweight transforming and regulating device capable of providing stabilized adjustable output voltages that does not require filtering stages and that does not introduce interferences in the electricity network.

It is another object of the present invention to provide an efficient adjustable and relatively lightweight transforming and regulating device having "soft start" capabilities.

It is a further object of the present invention to provide an efficient adjustable and relatively lightweight transforming and regulating device which is not based on Pulse Width Modulation (PWM) techniques.

It is yet another object of the present invention to provide a method and device for efficiently converting alternating voltage signals via a HF transformer by adjusting the voltages over the transformer coils by using one or more High Frequency Electromagnetic Voltage Regulator (HFEVR).

It is a further object of the present invention to provide a regulated transformation device wherein the transformation process can be controlled by HFEVR(s).

It is still another object of the present invention to provide a HFEVR with adjustable reactive resistance.

An additional object of the present invention is to provide a regulated transformer which provides control capabilities over the amplitudes and waveforms of the transformed signals.

Other objects and advantages of the invention will become apparent as the description proceeds.

SUMMARY OF THE INVENTION

The present invention is generally directed to an efficient voltage transforming and regulating device based on a High Frequency (HF) transformer and a HF Electromagnetic Voltage Regulator (HFEVR) serially connected to the transformer's coil(s). The transforming and regulating device of the invention (hereinafter termed regulated transformation device) efficiently transforms and stabilizes an input power source (hereinafter also referred to us input voltage or signal) without requiring filtering stages.

The regulation of a voltage signal according to the present invention is preferably carried out by utilizing one or more HFEVRs of the invention which comprise a coil magnetically coupled to an electromagnet, wherein said HFEVRs are connected to the primary and/or secondary coil(s) of a voltage transformer via their coils, and wherein the voltage over the primary and/or secondary coil(s) of said transformer is regulated by adjusting the value of the reactive resistance of said coils of said HFEVRs by suitable control signal provided to the their electromagnets.

The term signal modulation is used herein to refer to the operation of continuously adjusting the amplitude of a periodic signal to the amplitude of another time varying signal, as obtained by multiplying these signals (e.g., Amplitude Modulation—AM). The term periodic signal is used herein to refer to a time varying signal having a wave form pattern which is periodically repeated within a fixed period of time. The term regulation is used herein to refer to adjusting the amplitudes of a signal to conform to a desired wave form, or in other words eliminating deviations from a desired wave form. The term combined signal or rectified signal are used herein to refer to signals obtained after inverting the polarity of all portions of a signal having a specific polarity, namely converting the signal into a unipolar signal.

The term switched bridge refers herein to an arrangement of controllable electrical switching devices connected in a bridge circuit e.g., transistor bridge. The term electromagnetic voltage regulator generally refers to a voltage regulator having a reactive resistance element which its reactive resistance value is electromagnetically controllable.

In one aspect the present invention is directed to a method for transforming and/or regulating a periodic electrical source signal (e.g., sinusoidal signal) wherein a modulated signal is generated by modulating a periodic alternating signal with a source signal having a time period relatively greater than the time period of said periodic alternating signal, transforming, by means of a voltage transformer, and concurrently regulating the modulated signal, rectifying the transformed regulated signal and periodically inverting the polarization of portions of this rectified signal, wherein the regulation of the transformed signal is carried out by continuously adjusting the reactive resistances of the coils of one or more electromagnetic voltage regulating devices connected to the primary and/or secondary coils of the transforming device.

The transformation and regulation are preferably carried out utilizing a high frequency transformer and a high frequency electromagnetic voltage regulator(s) connected to at least one of the coils of said high frequency transformer. The source signal may be a unipolar periodic voltage signal or an alternating periodic signal.

The method may further comprise generating a rectified voltage signal by rectifying the source signal such that the modulated signal is generated by modulating the periodic alternating signal with said rectified voltage signal.

The regulation may be performed utilizing a closed loop control scheme in which the reactive resistance of the electromagnetic voltage regulator(s) is continuously adjusted according to the value of the transformed and regulated voltage signal. The regulation of the signal preferably adjust the wave form of the transformed signal to conform with a desired wave form, for example a sinusoidal signal.

Regulation of the transformed signal is preferably carried out by continuously adjusting the reactive resistance of a first high frequency electromagnetic voltage regulator serially connected to a primary coil of the high frequency transformer, and of a second high frequency electromagnetic voltage regulator serially connected to a secondary coil of the high frequency transformer, for providing a desired waveform.

According to another aspect the present invention is directed to a regulated transformation device comprising: a modulator for modulating a periodical alternating signal by signal of a power source; a regulated transformer for transforming and regulating the signal outputted from the modulator, wherein the regulated transformer consists of a transformer, wherein at least one coil of which is serially connected to an electromagnetic voltage regulator; an additional rectifier for rectifying the signal outputted by the regulated transformer; a switched bridge for periodically inverting polarization of portions of the signal outputted by the additional rectifier; and control logic for providing suitable control signals for operating the modulator, the switched bridge and the electromagnetic voltage regulator; wherein the regulating is carried out by continuously adjusting the reactive resistance of the electromagnetic voltage regulator.

The transformer is preferably a high frequency transformer and the electromagnetic regulator is preferably a high frequency electromagnetic voltage regulator.

The regulated transformer may comprise two electromagnetic regulators, one of which is serially connected to the primary coil of the transformer, and second of which is serially connected to the secondary coil of said transformer.

Preferably, the modulator is realized by a switched bridge.

The regulated transformer may comprise A/D for digitizing the transformed voltage signal and one or more controllable power source(s) for driving the control terminals of the electromagnetic voltage regulator(s).

Optionally, the control logic is realized by a controller. Preferably, the switched bridges are realized utilizing MOSFETs. The transformation device may further comprise a rectifier, wherein the signal of the power source is provided to the switched bridge via said rectifier.

According to a further aspect the present invention is directed to a regulated transformation device comprising: a modulator for modulating a periodical alternating signal by a voltage signal of a power source; a regulated transformer for transforming and regulating the signal outputted from the modulator, wherein the regulated transformer consists of a transformer comprising a primary coil and two secondary coils each of which connected to an electromagnetic voltage regulator; two additional rectifiers for rectifying the voltage signals outputted via the secondary coils of the regulated transformer; two switching devices, each of which connected to an output of one of the additional rectifiers for controlling connection of the additional rectifiers to a load; and control logic for providing suitable control signals for operating the modulator, the switching devices and the electromagnetic voltage regulators; wherein the regulating is carried out by continuously adjusting the reactive resistance of the electromagnetic voltage regulator.

Preferably, the modulator is realized by a switched bridge. The switching devices and/or the switched bridge are preferably realized utilizing MOSFETs.

According to yet another aspect the present invention is directed to a voltage regulator comprising: an electromagnetic voltage regulator serially connected to a load; a first switching device serially connected to the electromagnetic voltage regulator and a first diode serially connected to the load for delivering current thereto from a power source in one direction; and a second switching device serially connected to the load and a second diode serially connected to the electromagnetic voltage regulator for delivering current thereto from said power source in the opposite direction; one additional switching device connected in parallel to said electromagnetic voltage regulator and load for preserving continuous current flow therein while said first and second switching devices are in a disconnecting state; and control logic for providing suitable control signals for operating said first and second switching devices, said first additional switching device and said electromagnetic voltage regulator; wherein regulating is carried out by continuously adjusting the reactive resistance of said electromagnetic voltage regulator.

The regulator preferably utilizes a second additional switching device connected in parallel to the electromagnetic voltage regulator and load, wherein each of said first and second additional switching devices are adapted to preserve continuous current flow through the load in a specific direction. The switching devices are preferably realized utilizing MOSFET(s).

The present invention is also directed to an electromagnetic voltage regulator comprising: an inductive element (coil) magnetically coupled to an electromagnet such that the magnetic field produced by the electromagnet is induced into a core of said inductive element and thereby alters its inductance. The electromagnetic voltage regulator may further comprise a constant magnetic element for inducing a magnetic field into the core of the inductive element.

Preferably, the electromagnet comprises a "U" shaped core adapted to encompass the inductive element between its arms. The core of the electromagnet is preferably made of Iron, and the core of the inductive element is preferably made of Ferrite.

DETAILED DESCRIPTION OF PREFERRED EMBODIMENTS

The present invention is generally directed to an efficient transforming and regulating device based on a High Frequency (HF) transformer and a HF Electromagnetic Voltage Regulator (HFEVR) linked to the transformer's coil(s). The regulated transformation device of the invention (hereinafter termed transformation device for the sake of simplicity) efficiently transforms and stabilizes an input power source (hereinafter also referred to us input voltage or signal) without requiring filtering stages.

By the use of the term HF (High Frequency) it is generally meant to refer to frequencies in the range 20 to 1000 kHz. The term regulated HF transformer is used herein to refer to a HF transformer the voltage output of which is regulated by at least one HFEVR serially connected to a primary or a secondary coil thereof.

The present invention is also directed to a method for transforming periodic alternating voltage signal utilizing a relatively lightweight transforming device, wherein a HFEVR is used in the transformation stage to provide control capabilities over the transformation process.

In principle, the objectives of the invention are achieved by isolating the processes of conversion and reshaping of the input voltage signal from both the power source (e.g., the electricity network) and from the load (e.g., electrical engine, domestic electrical appliances, etc.), which is obtained by breaking the transformation process into several stages.

Figure 1A:
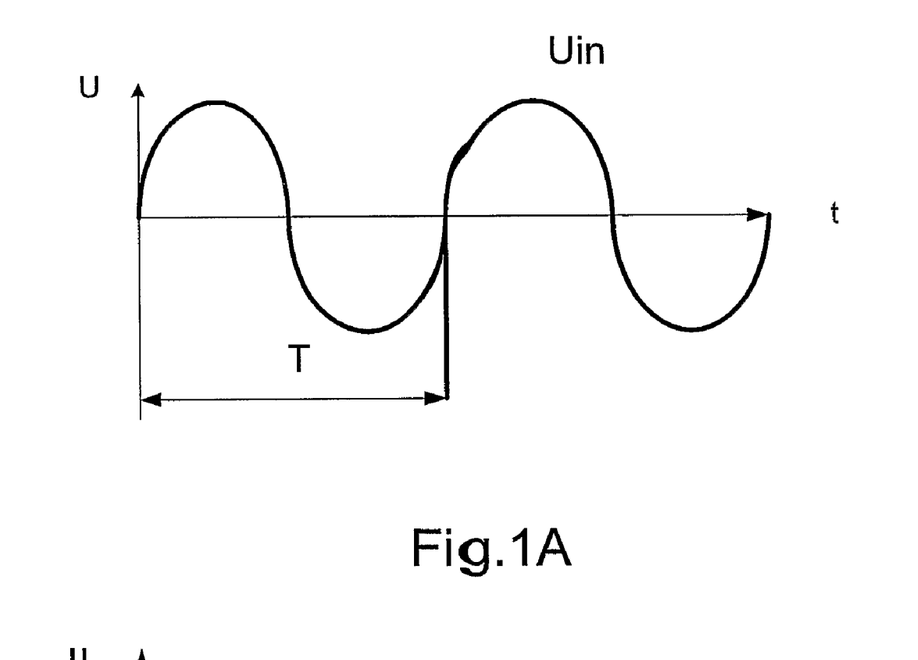
FIG. 1A is a time diagram of a periodic sinusoidal alternating voltage; signal
Figure 1B:
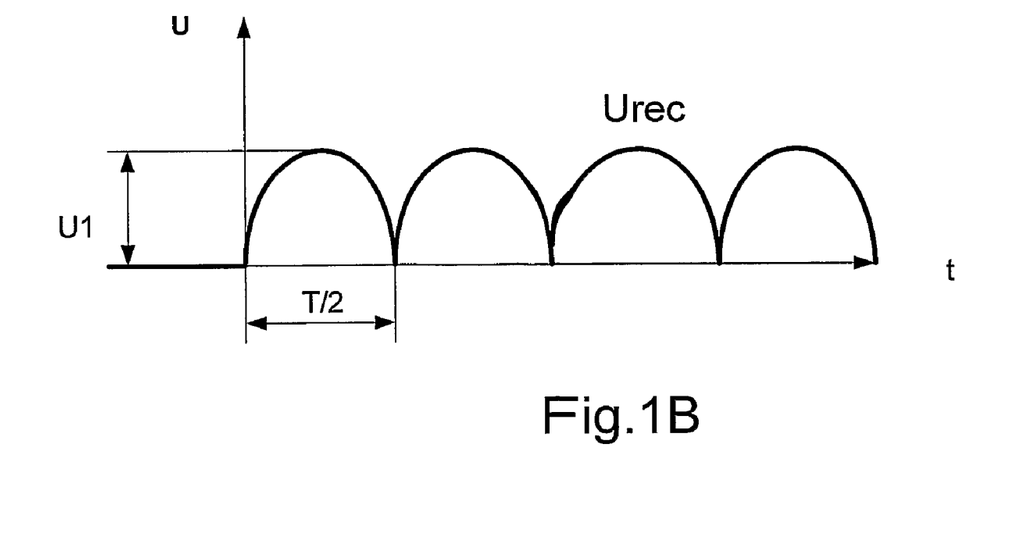
FIG. 1B is a time diagram demonstrating full-wave rectification of the alternating signal shown in FIG. 1A.
Figure 6:
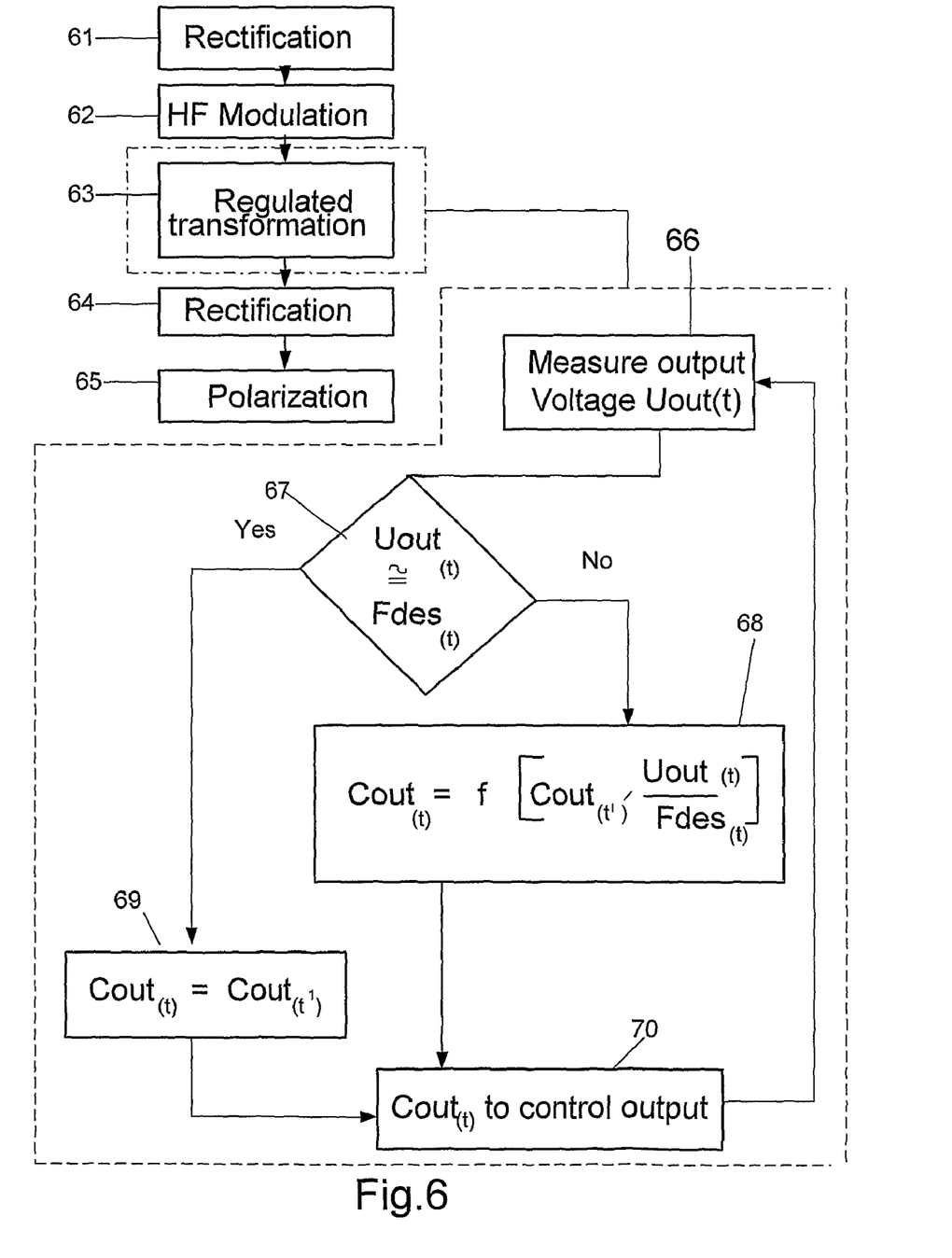
FIG. 6 is a flowchart illustrating a preferred regulated transformation method according to the invention.

According to a preferred embodiment of the invention the conversion process begins in a rectification step 61 (in FIG. 6) wherein an alternating polarity voltage signal $U_{in}$(FIG. 1A) of the power source (e.g., sinusoidal voltage) is converted into an uninterrupted succession of unipolar half-waves voltage signal $U_{rec}$ (FIG. 1B). The half-wave voltage signal $U_{rec}$ is then converted in step 62 into a bipolar HF voltage signal by modulating the unipolar half-waves voltage signal $U_{rec}$ with a periodical bipolar HF signal. The periodical bipolar HF signal is preferably a pulsating signal comprising positive and negative pulses of equal durations.

Figure 2:
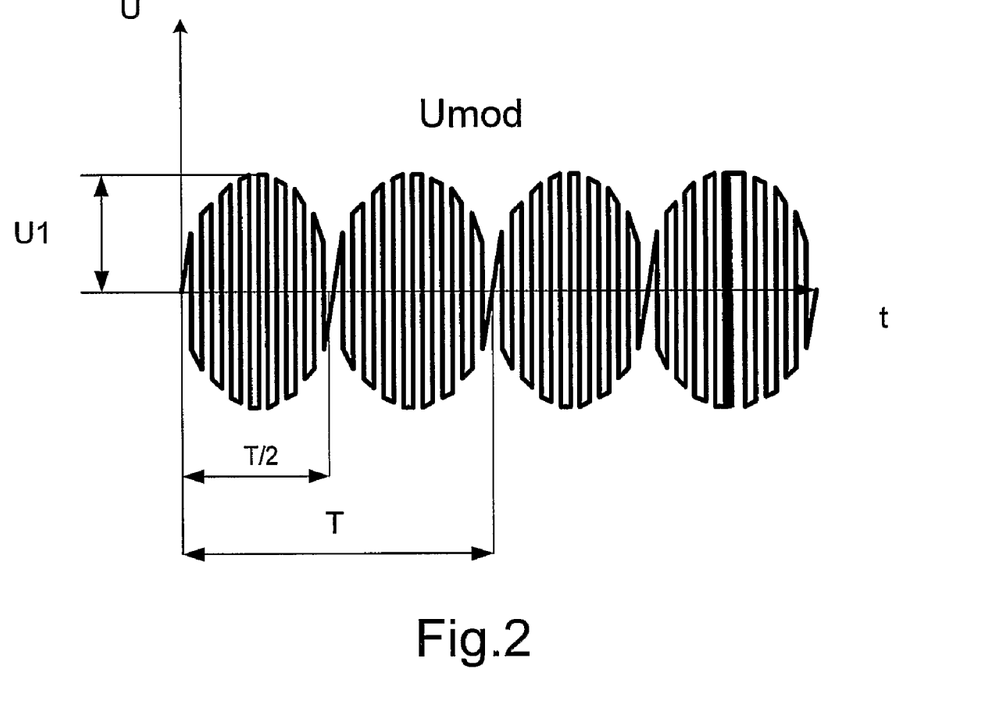
FIG. 2 is a time diagram showing modulation of the unipolar half-waves of FIG. 1B with HF (high frequency) bipolar voltage signal.
Figure 3:
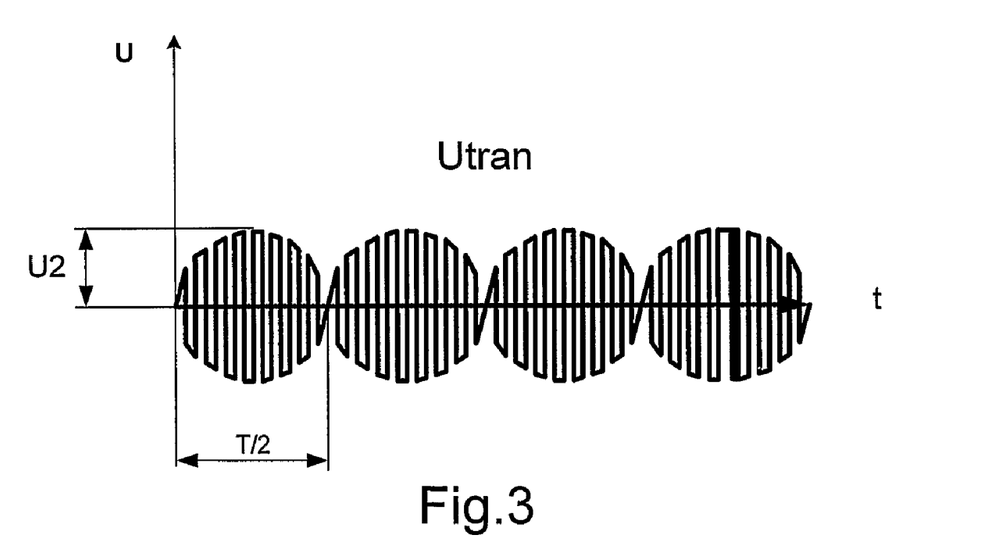
FIG. 3 is a time diagram demonstrating regulated transformation of a HF bipolar voltage signal as shown in FIG. 2 by a HF transformer.

The modulated voltage signal $U_{mod}$ (FIG. 2) is then transformed in step 63 by a regulated HF transformer comprising a HF transformer which at least one coil of which is linked to a HFEVR (High Frequency Electromagnetic Voltage Regulator) for adjusting the magnitude of the transformed voltage signal $U_{tran}$ (FIG. 3). As will be explained herein later in details the reactive resistance ($X_{EVR}$) of the HFEVR can be adjusted by providing it suitable control signals. In this way the magnitude of the transformed voltage signal $U_{tran}$ can be continuously adjusted to obtain desired magnitudes and waveforms. For example, the HFEVR may be serially connected to the primary coil of the HF transformer, thereby allowing control of the amplitude, and of the waveforms, of the output voltage $U_{tran}$ provided by the HF transformer. Alternatively, the HFEVR may be serially connected to the secondary coil of the HF transformer.

According to a preferred embodiment of the invention the regulated HF transformer comprises a first HFEVR serially connected to the primary coil of the HF transformer, and a second HFEVR serially connected to the secondary coil of the HF transformer, thereby providing increased capabilities of adjusting the amplitudes and waveform shapes (e.g., sinusoidal) of the transformed voltage signal $U_{tran}$. In this way the amplitudes of the modulated voltage signal $U_{mod}$ provided to the terminals of the primary coil of the regulated HF transformer via the first HFEVR may be adjusted by providing the first HFEVR suitable control signals thus regulating the voltage delivered to the primary coil of the transformer. The transformed voltage signal $U_{tran}$ obtained at the terminals of the secondary coil of the regulated HF transformer may be further adjusted by providing suitable control signals to the second HFEVR serially connected thereto.

In result, transformed modulated voltage signal $U_{tran}$ (FIG. 3) having the desired amplitude and waveform (e.g., a sinusoidal half-waves envelope) is obtained at the output terminals of the regulated HF transformer. The amplitude of the transformed modulated voltage signals $U_{tran}$ is determined by both the transformation ratio of the HF transformer and by the adjusted reactive resistances of the first and second HFEVRs of the regulated HF transformer.

For Example, assuming that for a given modulating frequency $F_{mod}$ the reactive resistance of the primary coil of the HF transformer is $X_{pri}$ and the reactive resistance of the HFEVR connected thereto is $X_{EVR}$, and assuming that their real ohmic resistance is negligibly small. Hence, for a given Transformation Ratio TR the transformed voltage obtained at the terminals of the regulated HF transformer operating with a single HFEVR connected to the primary coil of the HF $$\text{HF transformer is} - U_{tran} = U_{mod} \cdot \frac{X_{pri}}{X_{EVR} + X_{pri}} \cdot TR.$$

Figure 4:
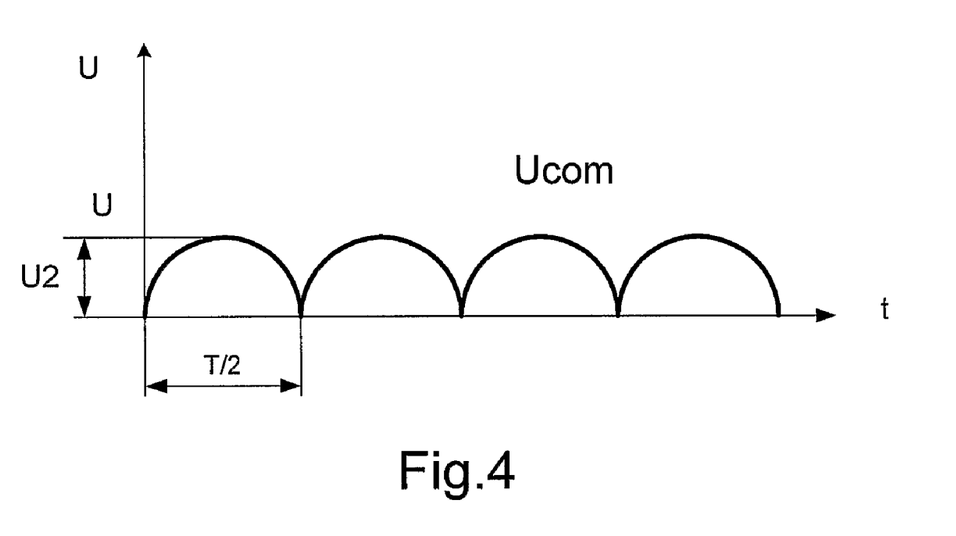
FIG. 4 is a time diagram demonstrating the voltage signal obtained by rectifying the voltage signal shown in FIG. 3.

The transformed modulated voltage signal $U_{tran}$ is then rectified (combined) in step 64 (e.g., via a diode bridge) to obtain a unipolar voltage signal $U_{com}$ (FIG. 4), such that a continuous half-wave unipolar voltage signal is obtained. The combined unipolar half-wave signal $U_{com}$ is then converted in the polarization step 65 (e.g., via a switched bridge) into a bipolar voltage signal $U_{out}$ (FIG. 5) which periodically alternates the direction of the current passed to the load through the terminals of the secondary coil of the regulated HF transformer.

In a preferred embodiment of the invention a control unit is utilized for producing the control signals required for carrying out the HF modulation (step 62) and polarization (step 65) which are preferably performed via switched bridges (e.g., MOSFET transistor bridges), and for the regulation of the transformed voltage (step 63). An A/D may be used by the control unit for sampling the transformed signal. One or more controllable power source(s) may be also used by the control unit for providing control signals to the HFEVR(s).

Possible regulation of the transformed voltage is exemplified in steps 66-70. In step 66 the output voltage $(U_{out(t)})$ of the regulated HF transformer is measured, thereafter in step 67 it is checked if the measured output voltage is within a tolerable rage of values about a desired value $(F_{des(t)})$. In the affirmative case, in step 69, the control signal $(C_{out(t)})$ provided to the HFEVR of the regulated HF transformer equals to the previously applied control signal $(C_{out(t)}=C_{out(t')})$ Otherwise, in step 68 the control signal $(C_{out(t)})$ is adjusted according to the previously applied control signal $(C_{out(t')})$ and the ratio (or difference) between the measured output voltage $(U_{out(t)})$ and the desired value $(F_{des(t)})$. Thereafter, in step 70, control signal $(C_{out(t)})$ is applied to the HFEVR.

The present invention also allow using HF pulses of variable lengths for modulating a sinusoidal half-waves voltage signal when starting (ignition) the operation of the transformation device (i.e., "soft start") and when switching-off the transformation device. During the normal operation of the transformation device the frequency of the modulated HF pulses is about 50 to 100, preferably about 60, times higher than the frequency of the alternating voltage signal $U_{in}$ of the power source, and could be made dependant on the time elapsed since the device has been switched-on.

For example, if the frequency of the power source $U_{in}$ is F=50 Hz and the frequency of the modulated HF pulses during normal operation of the transformation device is $F_{mod}$=60 F=3000 Hz, then the frequency of the modulating HF pulses $F_{mod}$ may be changed within a soft start ignition from 500 Hz to 3000 Hz during a time period of about 1-30 sec. Similarly, when the transformation device is switched-off the modulating HF pulses $F_{mod}$ may be changed from 3000 Hz to 500 Hz during a time period of about 1-30 sec.

The present invention also provide a simplified procedure for transforming alternating voltage signals wherein the alternating voltage signal $U_{in}$ of the power source is modulated by pulses of a relatively low frequency (e.g., ~500 Hz). In this case, the alternating voltage signal $U_{in}$ of the power source is divided into positive and negative half-waves by separately transforming the alternating voltage signal(e.g., by utilizing a transformer with two secondary coils), and each of the sequences of half-waves is transformed separately into pulses modulated by the half-waves. The two sequences are then combined at the load.

The present invention is also directed to a regulated transformer comprising a transformer and at least one HFEVR connected to a primary and/or secondary coil thereof, where the output voltage of the regulated transformer device is regulated by the HFEVR.

The present invention is also directed to a HFEVR comprising an electromagnet unit magnetically coupled to an inductor, wherein the magnetic field produced by the electromagnet unit is induced into the core of the inductor and thereby modifies the magnetic field which passes through the core of the inductor of the HFEVR, thus changing its reactive resistance.

Figure 8:
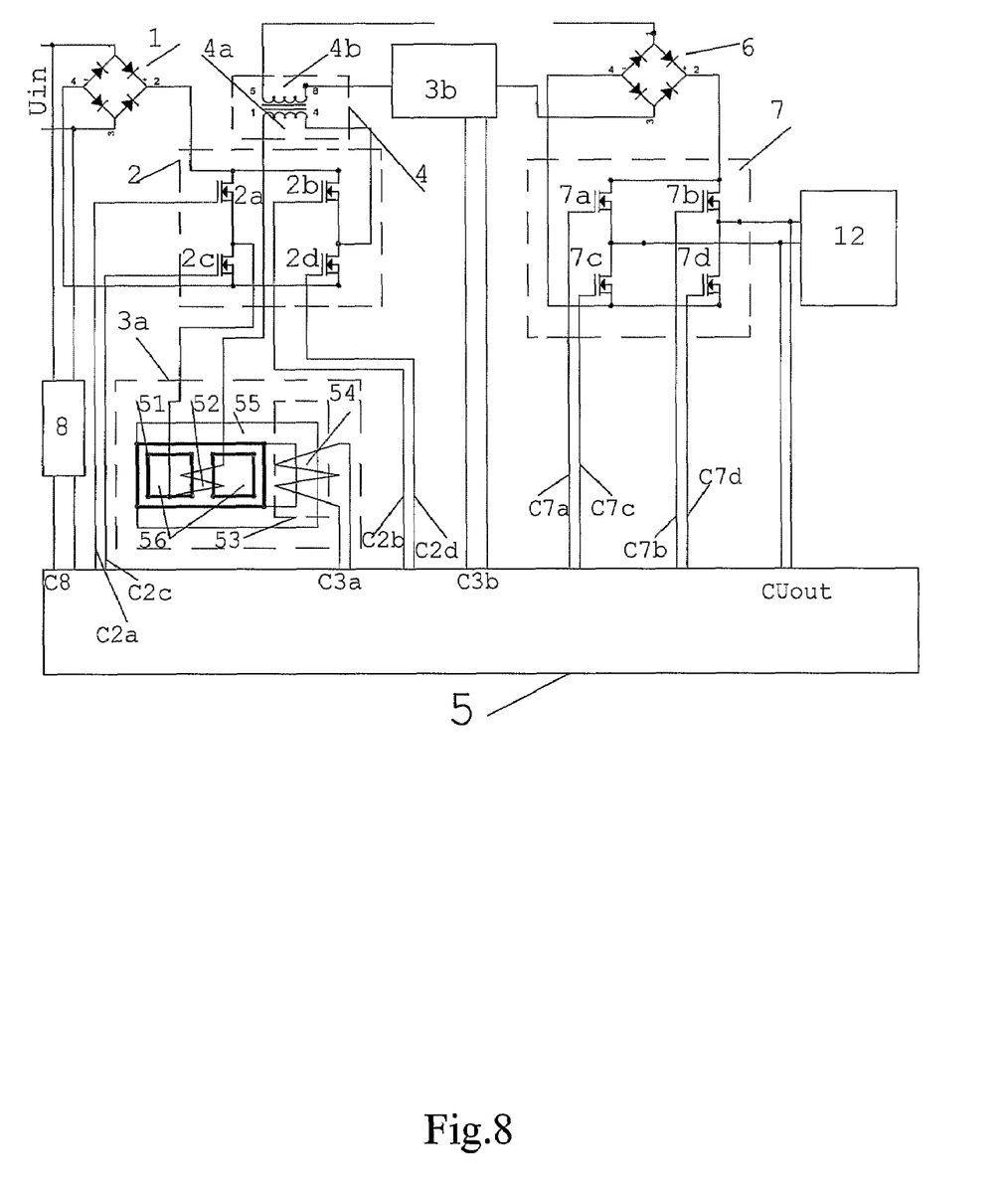
FIG. 8 shows an electrical circuit of a regulated transformation device according to one preferred embodiment of the invention.

One preferred embodiment of the invention is depicted in the electrical diagram shown in FIG. 8. The transformation device shown in FIG. 8 comprises a HF transformer 4 (e.g., toroidal transformers of Magnetics) the primary coil 4a of which is connected through a switched bridge 2 (e.g., MOSFET transistor bridges) and a diode bridge 1 to the power source $U_{in}$. The output of the secondary coil 4b of the HF transformer 4 is connected to the input of diode bridge 6, the output of which is connected to the input of switched bridge 7 (e.g., transistor bridge). The primary and secondary coils, 4a and 4b, of HF transformer 4 are serially connected to HFEVRs, 3a and 3b, respectively. Load 12 is connected to the output terminals of switched bridge 7.

Controller 5 is utilized for producing the required control signals $C_{2a}$-$C_{2d}$ and $C_{7a}$-$C_{7d}$ for operating the switched devices 2a-2d and 7a-7d (e.g., transistor switches) and control signals $C_{3a}$ and $C_{3b}$ which regulates the transformed voltage of the regulated HF transformer. The controller power supply is preferably provided from the power source via low power auxiliary transformer 8.

The power source voltage, for example sinusoidal voltage $U_{in}$ shown in FIG. 1A having amplitude U1 and time period T, is provided to the input of rectifier 1 (e.g., diode bridge), which outputs a continuous unipolar half-waves voltage signal, for example $U_{rec}$ shown in FIG. 1B having amplitude U1 and time period T/2. The unipolar half-waves voltage signal is fed through the HFEVR 3a to the input of switched bridge 2 (e.g., transistor bridge). Control signals $C_{2a}$-$C_{2d}$ produced by controller 5 provides switched bridge 2 HF pulses which are modulated by the output voltage signal provided by diode bridge 1. More particularly, control signals $C_{2a}$-$C_{2d}$ are used to switch the states of the switches on a first diagonal (e.g., diagonal between switches 2a and 2d) of switched bridge 2 into their ON states and the states of the switches on a second diagonal (e.g., the diagonal between switches 2b and 2c) into their OFF states, and vice versa, which in result converts the unipolar half-waves voltage signal into a modulated voltage signal, for example $U_{mod}$ shown in FIG. 2.

In other words, the modulated voltage signal may be obtained by providing control signals $C_{2a}$ and $C_{2d}$ consisting of a sequence of HF pulse signals, and control signals $C_{2b}$ and $C_{2c}$ consisting of a complementary sequence of the same HF pulse signals, such that the sequence of HF pulse signals $C_{2b}$ and $C_{2c}$ are modulated by the continuous unipolar half-waves voltage signal provided to the input of switch bridge 2. The pulse waves of the HF pulse signals $C_{2b}$ & $C_{2c}$ and of $C_{2a}$ & $C_{2d}$ are preferably of equal duration, or in other words, they are shifted one half of the pulse wave period relative to each other.

The modulated voltage signal (e.g., $U_{mod}$), outputted by switch bridge 2 is transformed by HF transformer 4, having transformation ratio TR, for example TR=½. The amplitude of the transformed voltage, for example $U_{tran}$ shown in FIG. 3 having amplitude U2 and time period T/2, may be modified by increasing the reactive resistance of the HFEVRs 3a and 3b serially connected in series to the primary and secondary coils, 4a and 4b respectively, which in result leads to diminishing the amplitude of the transformed voltage signal. Adjustments of the reactive resistances of the HFEVRs 3a and 3b via suitable control signals also can be used to modify the waveform of the transformed voltage signal. The voltage outputted from the secondary coil 4b of HF transformer 4 is provided to the input of rectifier 6 (e.g., diode bridge) via HFEVR 3b. Consequently, the voltage signal outputted from rectifier 6 assumes the shape of a unipolar continuous sequence of half-waves signals, for example $U_{com}$ shown in FIG. 4 having amplitude U2 and time period T/2.

Figure 5:
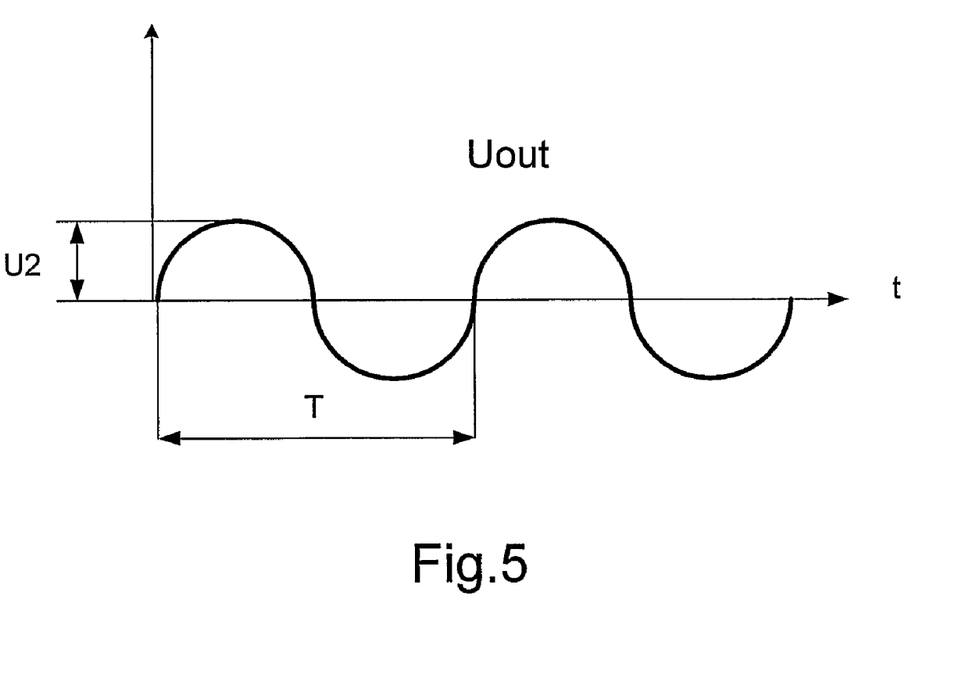
FIG. 5 is a time diagram demonstrating the voltage signal obtained by the polarization of half-waves of the voltage signal shown in FIG. 4.

The unipolar continuous sequence of half-waves outputted from rectifier 6 is fed into switch bridge 7, wherein it is converted into the final output voltage signal by inverting the polarization of any second half-wave, for example sinusoidal voltage signal $U_{out}$ shown in FIG. 5 having amplitude U2 and time period T. This is accomplished by switching the switches on one diagonal (e.g., 7a and 7d) of the switch bridge 7 into their ON state while switching the switches on the other diagonal (e.g., 7b and 7c) into their OFF state, and vice versa. By providing suitable control signals $C_{7a}$-$C_{7d}$, produced by controller 5, this periodical alternating switching of the states of the switches on the diagonals of switch bridge 7 periodically changes the direction of current in the load 12.

The scheduling of the switching of the switches on the diagonals of switch bridge 7 is derived by controller 5 according to the phase of the power source. More particularly, the states of the switches on the diagonals of switch bridge 7 are switched during the time in which the polarity of the power source is changed from positive to negative and vice versa.

Figure 14:
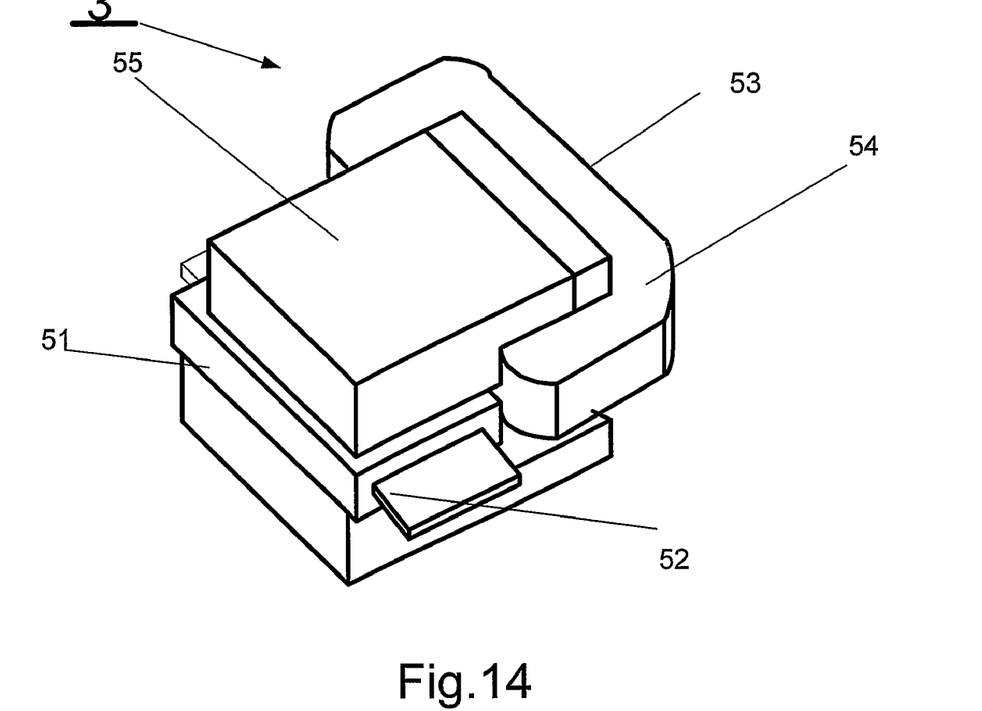
FIG. 14 shows a perspective view of the HFEVR of the invention.

The HFEVR 3 shown in FIGS. 8 and 14 may be realized with a HF magnetic element 51 magnetically coupled to a low-frequency magnetic element 53. The HF magnetic element 51 may be realized by an inductive coil 52 having an electromagnetic core (also numbered 51) magnetically coupled to the low-frequency magnetic element comprising electromagnet 54 and magnetic core 55. The degree to which magnetic core 55 of the low-frequency magnetic element 53 is magnetized is controlled by changing the electromagnet's feeding voltage (e.g., between 1 to 20 volts), which is carried out via control signals C3a and C3b provided by controller 5. When electromagnet 53 is fully magnetized, the core of the HF magnetic element 51 is also fully magnetized, and the inductance of the coil 52 approaches zero. When the degree of magnetization of the core 55 of the low-frequency magnetic element 53 is decreased, then the magnetization of the core of the HF magnetic element 51 is also decreased, and thus the inductance of the coil 52 increases.

According to a preferred embodiment the core of the high-frequency magnetic element 51 is made from a HF magnetic type of material, such as HF ferrite formed in a rectangular shape comprising two adjacent rectangular apertures 56 for winding the inductive coil therebetween. The spatial dimensions of the high-frequency magnetic element 51 are preferably in the range of 5×5 mm to 140×140 mm, preferably about 30×30 mm, and its thickness is generally about 5 to 30 mm, preferably about 18 mm.

Figure 15:
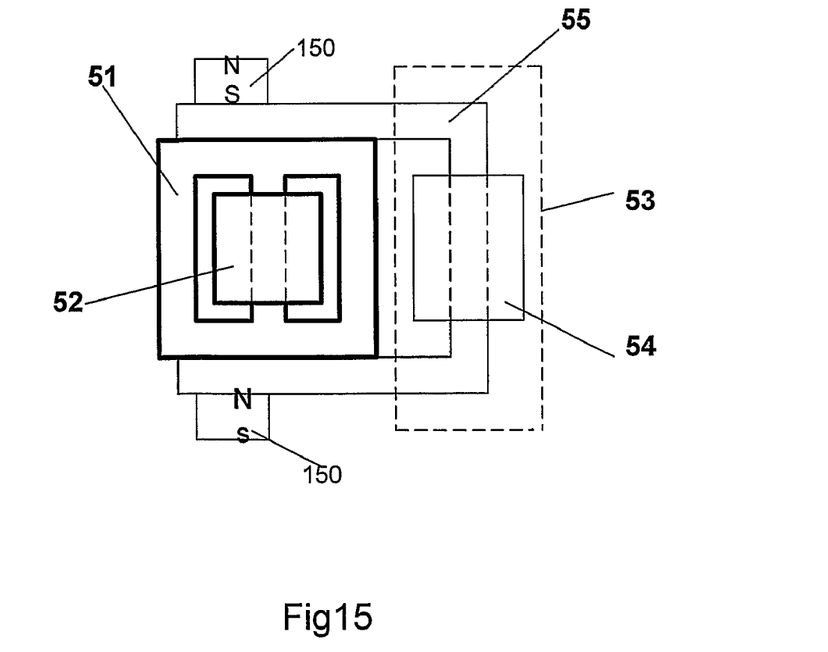
FIG. 15 demonstrates a HFEVR comprising a constant magnetic element.

The magnetic field induced in the HF magnetic element 51 may be enhanced by using a constant magnetic element 150, as exemplified in FIG. 15. In this example the South ("S") and North ("N") poles of the constant magnet element 150 are located near the tips of the arms of the U-shaped core 55. In this way the voltage range of the control signal of the HFEVR may be reduced.

Inductive coil 52 may be a regular coil having suitable inductance. For example, when operating with a 50 Hz/230 v power source coil 52 with inductance in the range of 10 micro-Henry (µH) to 10 milli-Henry (mH) is preferably used. In a preferred embodiment of the invention magnetic element 51 is preferably 3F3 manufactured by Payton. The coil of magnetic element 51 preferably comprises about 2 to 30 turns, preferably 6 turns. The magnetic core 54 of low-frequency magnetic element 53 can be manufactured from a magnetic material, such as Iron formed in a "U"-like shape with arms of length of about 20 to 300 mm and having a bout the same, or exactly the same, thickness as that of core 51. The "U"-like shape of core 51 is preferably designed to allow fitting of core 51 between "U"-like shaped arms of core 51.

Figure 12:
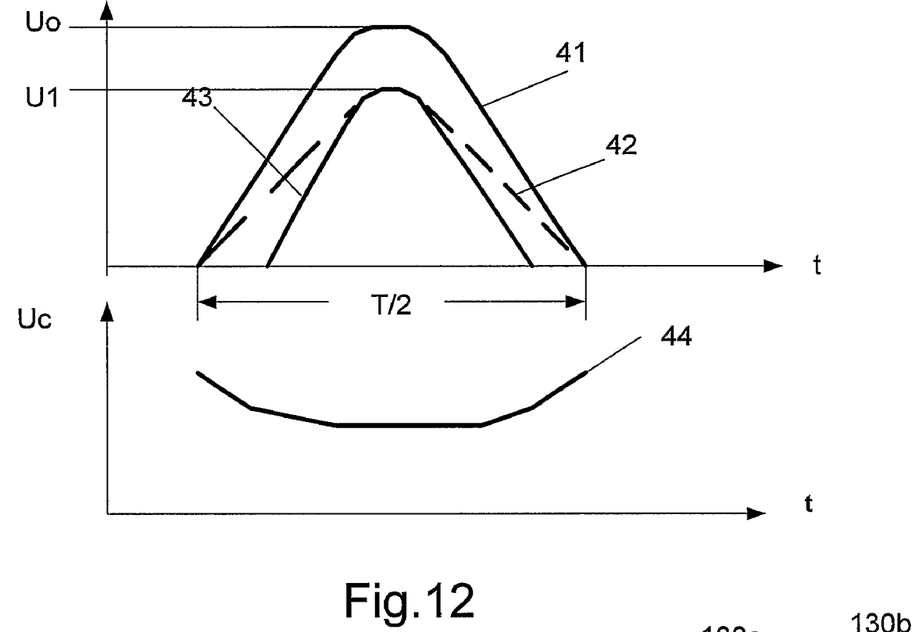
FIG. 12 shows time diagrams exemplifying preferred regulation scheme of the HFEVR of the invention.

With reference to FIG. 12, in order to regulate a voltage signal $U_0$ via HFEVR 3 within 10-15% of the voltage signal value the voltage of the control signal acting on the terminals of electromagnet 54 should be proportionally changed accordingly (i.e., the control voltage should be reduced correspondingly within the range 10-15%). If the control signal acting on the terminals of electromagnet 54 is further reduced the regulated voltage signal 43 is reduced and distorted. Thus, in order to further regulate the voltage signal it is necessary to provide the terminals of electromagnet 54 a variable voltage control signal 44, defined within the half-wave time period T/2. Such variable voltage control signal 44 is obtained when the closed loop regulation is carried out by controller 5, namely, by continuously measuring the regulated voltage ($C_{Uout}$) and correcting the control signal acting on the terminal of electromagnet 54 whenever the value measured deviates, for example, from a desired sinusoidal waveform, as exemplified in steps 66 to 70 in FIG. 6.

The transformation device shown in FIG. 8 may also comprise analog-to-digital and digital-to-analog converters (not shown) for digitizing the voltage outputted by the device ($C_{Uout}$) and measured by controller 5, and for converting digital control values derived by controller 5 for controlling the operation of the HFEVRs 3a and 3b into analog voltage signals, C3a and C3b.

According to another preferred embodiment of the invention the regulated HF transformer of the invention comprise two secondary coils operating in parallel. In this embodiment each of the secondary coils is connected to a rectifying diode bridge, and the voltage signals obtained at the outputs of the rectifying diode bridges are combined utilizing two switching devices (e.g., transistors) and a suitable control signal for altering the switches states. In this way, opening one of the switches (i.e., switching it into a disconnecting state—"OFF"), while closing the other switch (i.e., switching it into a connecting state—"ON"), changes the direction of current in the load.

Figure 10A:
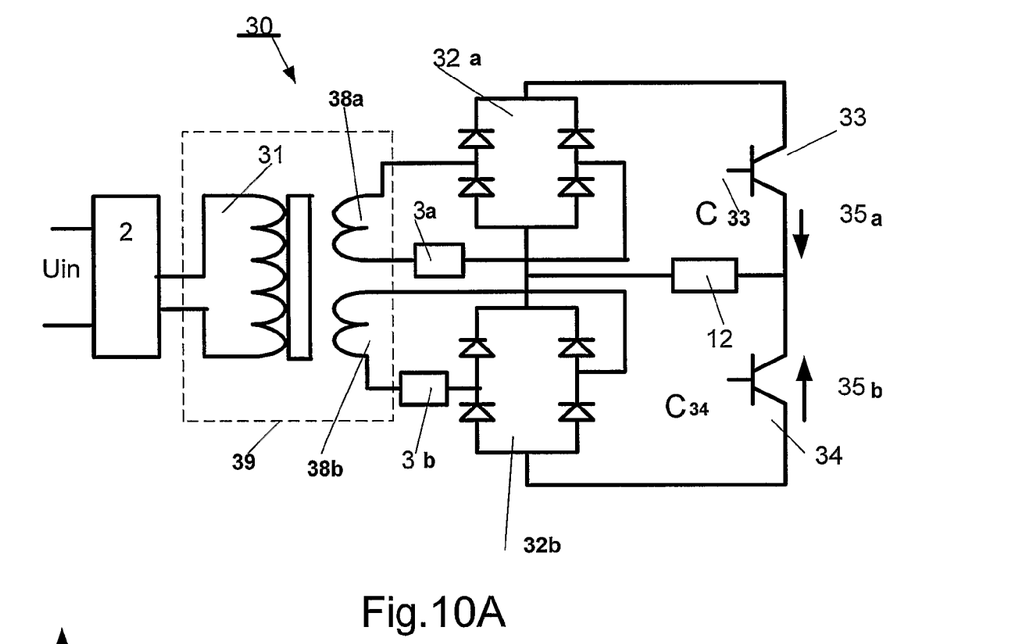
FIG. 10A shows an additional embodiment of the invention wherein the transformer of the regulated transformation device comprise two secondary coils.

The electrical circuitry 30 shown in FIG. 10A illustrates a preferred embodiment of the invention wherein the HF transformer 39 comprises two secondary coils, 38a and 38b, each of which is connected to the input of a respective diode bridge, 32a and 32b, via a respective HFEVR, 3a and 3b, serially connected thereto. In this preferred embodiment the power source signal Uin is used to modulate a HF pulse signal (not shown) by switched bridge 2, such that the voltage signal supplied to the primary coil of HF transformer 39 is a modulated signal similar to $U_{mod}$ shown in FIG. 2.

The transformed bipolar voltage signals obtained on the terminals of the secondary coils, 3a and 3b, are rectified by the respective rectifiers (32a and 32b) and combined in the load 12 by selective activation of one of the switching devices, 33 or 34 (e.g., transistor switches). Switching devices 33 and 34 are operated by providing suitable control signals $C_{33}$ and $C_{34}$ respectively, such that one of the switching devices (e.g., 33) is activated (i.e., switched to ON state) within the time interval of a half-wave period, while during the consecutive half-wave period said switching device is deactivated (i.e., switched to OFF state) and the other switching device (e.g., 34) is activated. In this way only one of the currents designated by 35a and 35b is supplied to load 12 at any given time in opposite flow directions.

The present invention also provide a simplified procedure for transforming alternating voltage signals wherein the alternating voltage signal of the power source modulates a relatively low frequency periodical pulse signal (e.g., ~3000 Hz). In this preferred embodiment the alternating voltage signal of the power source is divided by switching devices into two channels, one of which comprising the positive half-waves of the input voltage signal while the other channel comprises the negative half-waves, wherein portions of each sequence of half-waves are converted separately into pulses modulated by said half-waves. The two partially modulated signals are regulated by a HFEVR and combined in the load which is serially connected to the HFEVR. Two auxiliary circuits, each of which is switched into its ON state at predetermined time by additional switching devices, are preferably used for discharging the induction currents of the HFEVR during time intervals in which the dividing switching devices are in OFF state. The scheduling of the switching devices and the regulation of the HFEVR are preferably carried out by suitable control signals produced by a controller that monitors the phase of the input voltage of the power source.

The conversion of the input voltage of the power source into partially modulated signals is preferably carried out during predetermined intervals within each half-period of the input voltage. These time intervals are preferably shorter than the time intervals during which the additional switching devices are turned ON for discharging the induction currents of the HFEVR through the auxiliary circuits.

Figure 9:
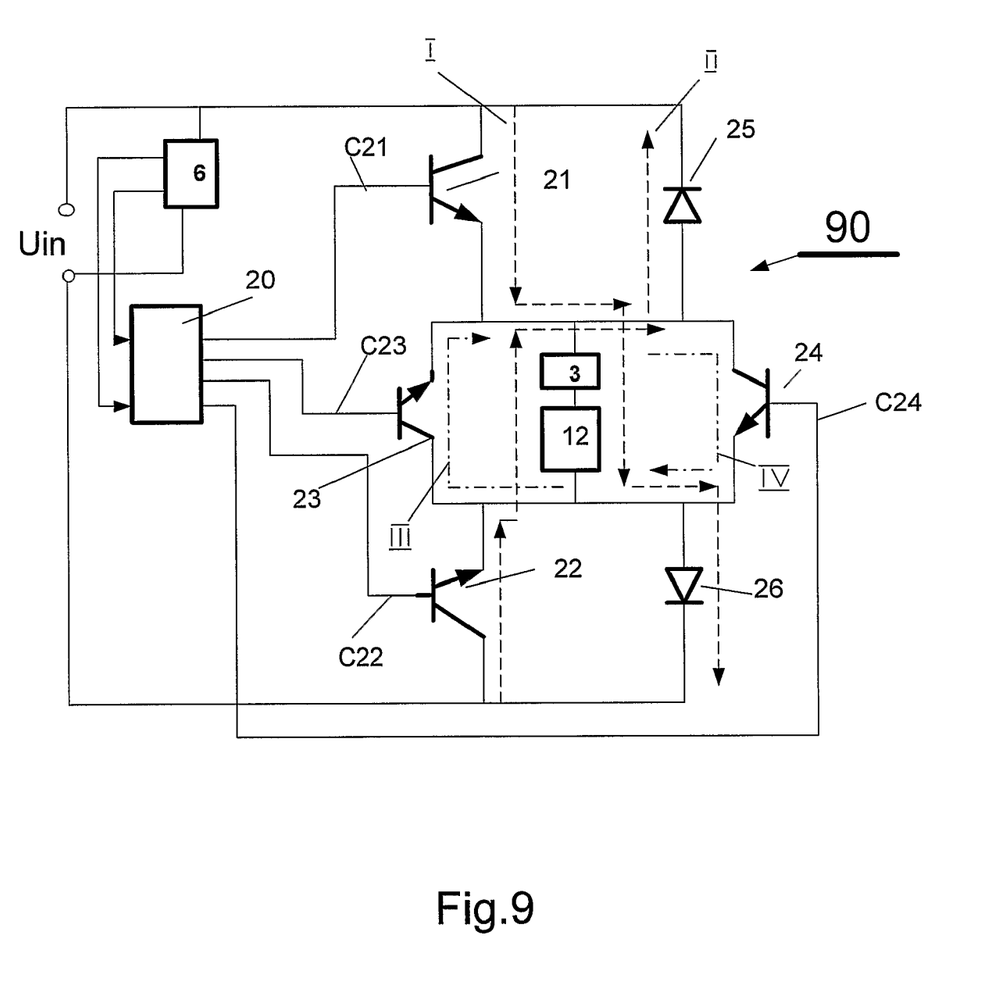
FIG. 9 shows an electrical circuit of a regulated transformation device according to another preferred embodiment of the invention.

The electrical diagram shown in FIG. 9 illustrates a preferred embodiment of a circuitry 90 for performing this simplified transformation process utilizing low frequency pulse signals. Circuitry 90 comprise a first conduction channel (I) in which electrical currents are supplied to load 12 and HFEVR 3 via switching device 21 where said currents are returned to the power source via diode 26, and a second conduction channel (II) in which the electrical currents are supplied to load 12 and HFEVR 3 via switching device 22 and thereafter returned to the power source via diode 25.

Circuitry 90 also comprises two discharge channels, III and IV, in parallel to the load 12 that provides a passage for discharging the induction currents from the HFEVR. Discharge channel III is realized by switching device 23 and discharge channel IV is realized by switching device 24, both of which are connected in parallel to the HFEVR 3 and load 12.

The operation of switching devices 21, 22, 23, and 24 is carried out utilizing suitable control signals $C_{21}$, $C_{22}$, $C_{23}$, and $C_{24}$ produced by controller 20 that monitors the phase of the input voltage $U_{in}$ through an auxiliary device 6, the input of which is connected to the power source. The voltage provided to load 12 is regulated by controller 20 by providing HFEVR 3 suitable control signals (not shown).

During the operation of circuitry 90 each of the conduction channels, I and II, is utilized to conduct only portions of the wave signal which are of specific polarity. For example, the first conduction channels I may be dedicated for supplying only the positive half-waves of the input voltage, while the second conduction channels II may be dedicated for supplying only the negative half-waves of the input voltage, as exemplified in FIG. 7. Normally, switching devices 21 and 22 are closed, and a conduction channel is activated only when the state of one of the switching devices is turned to ON.

For example, in a preferred embodiment of the invention the time interval $t_2$ (FIG. 7) during which supply currents are supplied via a conduction channel, I or II, is smaller by 10 to 15% from the time of a half-period (T/2) of the input voltage of the power source, and its time duration is preferably within $(T/4)-(t_2/2) \div (T/4)+(t_2/2)$. During this time intervals the state of one of the switching devices, 21 or 22, is toggled between its ON and OFF states by sequences of pulses provided on the respective control line, C21 or C22. When the state of one of the switching devices (21 or 22) of conduction channels I or II is toggled a respective discharge channel, III or IV, is activated by changing the state of the respective switching device, 23 or 24, to ON, in order to provide continuous passage of the induction current via load 12.

Figure 7:
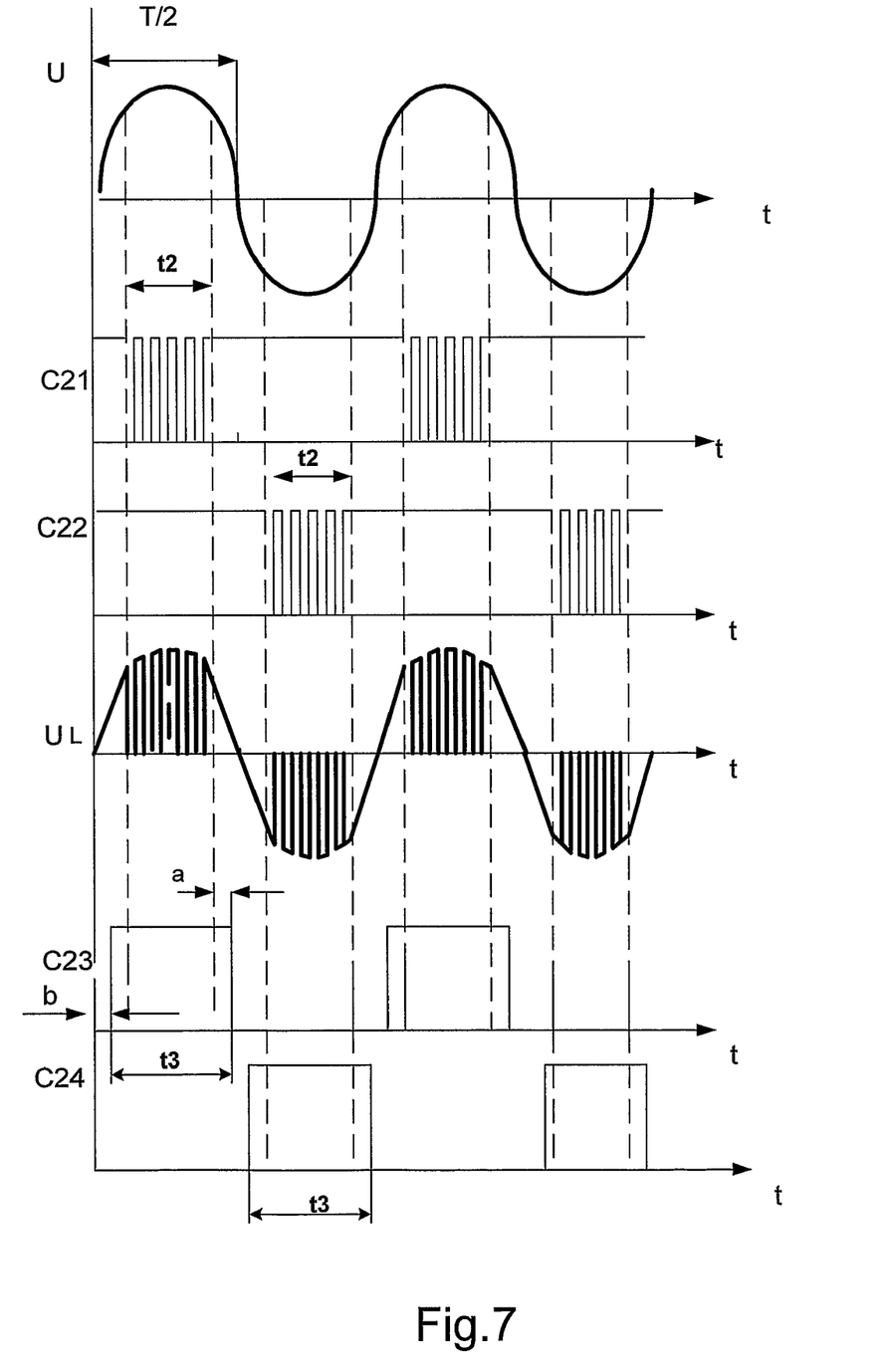
FIG. 7 shows time diagrams demonstrating control signals for operating the regulated transformation device shown in FIG. 9.

In a preferred embodiment of the invention the discharge channels, III and IV, are activated within each half-wave during time durations $t_3$ which are greater than time durations $t_2$ each half-wave during which the partial modulation is performed. The time duration $t_3$ during which the discharge channels, III and IV, are activated is smaller from a half-period (T/2) of the input voltage by time interval 2*b as illustrated in FIG. 7 (e.g., b~0.005 T). An important design requirement that should be kept in mind is to avoid short circuiting that may occur during the change of the polarity of the power source. The time interval $t_2$ during which the conduction channels are activated is smaller than the time interval $t_3$ during which the passage of induction currents is allowed by the value 2*a (e.g., a~0.01 T), as illustrated in FIG. 7, where $T/2=2b-t_3=t_2-2a-2b$.

Figure 13:
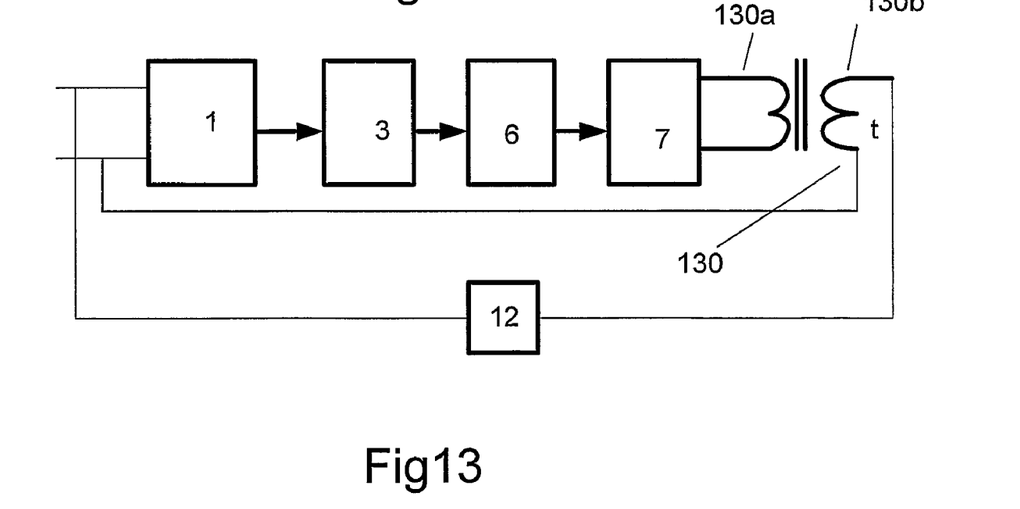
FIG. 13 shows an electrical circuit for obtaining vector sum of the voltages outputted by the regulated transformation device with another voltage source.

FIG. 13 demonstrates obtaining voltages vector sum according to the invention. In order to obtain vector sum of the voltages outputted by the transformation device with voltage of the power source $U_{in}$, the primary coil 130a of a transformer 130 may be connected to the output of a transformation device comprising rectifier 1 which receives the power source voltage $U_{in}$ as an input, a HFEVR 3 receiving the output voltage from rectifier 1 as its input, a rectifier 6 receiving the output voltage from HFEVR 3 as its input, and a switched bridge 7 receiving the output voltage from rectifier 6 as its input, while the secondary coil 130b of transformer 130 is serially connected to load 12 which is connected in parallel to power source $U_{in}$, as illustrated in FIG. 13.

Figure 10B:
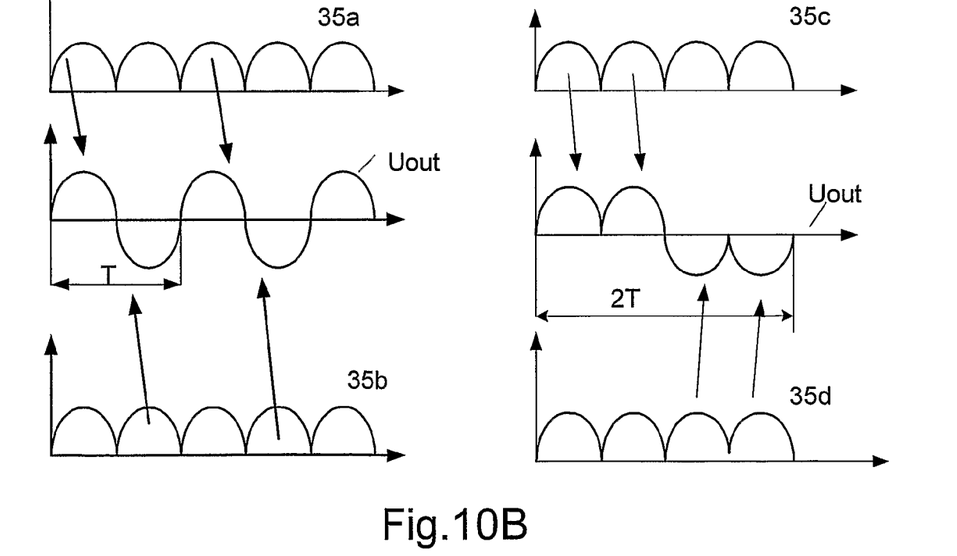
FIG. 10B shows time diagrams demonstrating combining unipolar half-waves into an alternating signal as obtained at the output of the device shown in FIG. 10A.

The power conversion method of the invention enables decreasing the frequency with which succession of the half-waves changes polarity, which, in effect, decreases the frequency of the outputted voltage. A method for decreasing the frequency is demonstrated by the time diagrams 35c and 35d shown in FIG. 10B. in this example the control signals provided to switching devices 33 and 34 in FIG. 10A periodically provides load 12 with two successive half-waves of the same polarity and thereafter two successive half-waves of the opposite polarity, thereby constructing a periodical output voltage with a time period of 2 T.

Figure 11:
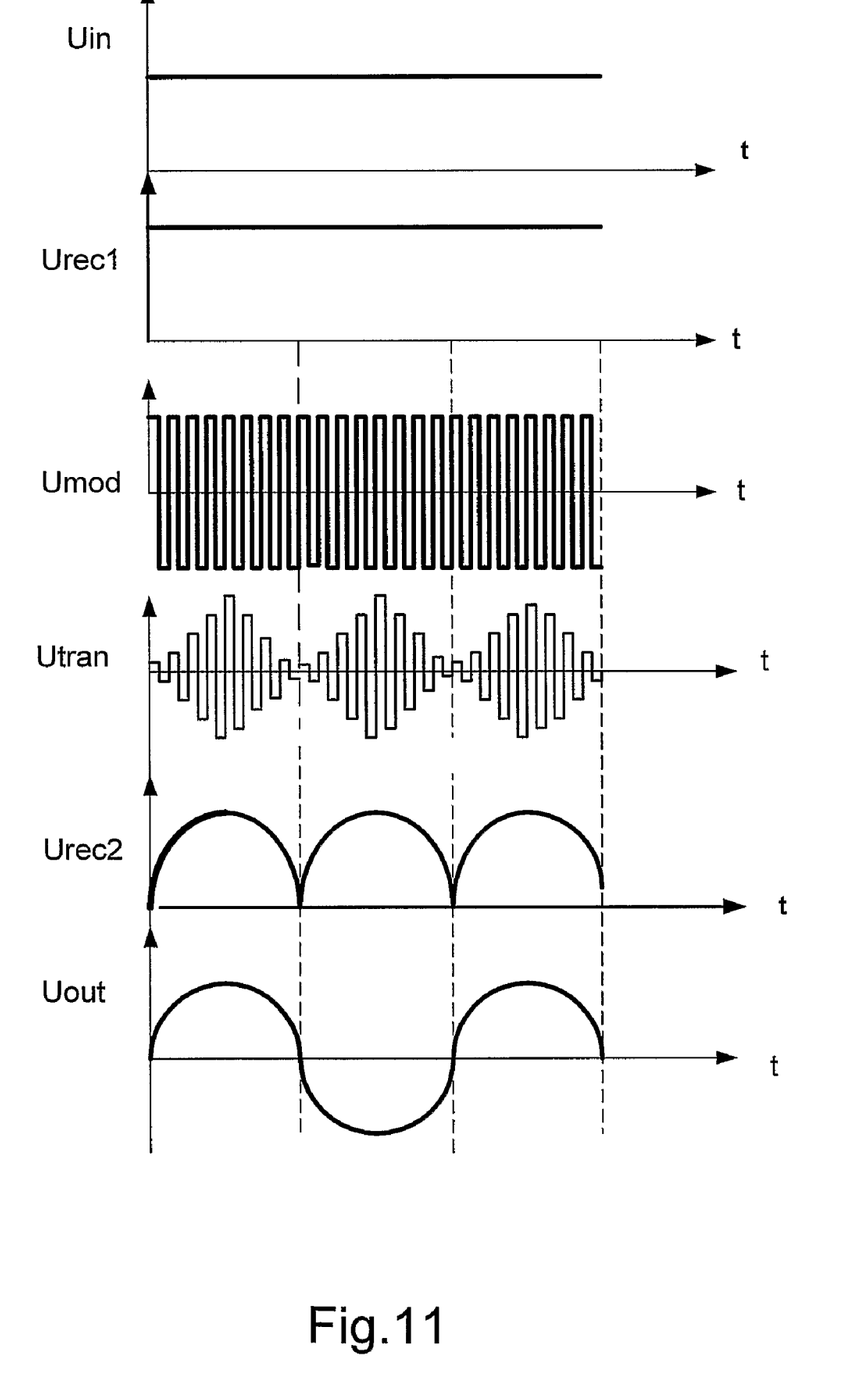
FIG. 11 shows time diagrams demonstrating the conversion of a constant voltage into an alternating voltage signal.

The transformation device of the invention may be designed to include capabilities of converting a constant voltage input signal into a smoothed shape alternating voltage signal (e.g., half-waves of sinusoidal voltage signal), as demonstrated in FIG. 11. With reference to FIG. 8, in this case the constant voltage input $U_{in}$ is also obtained on the output of rectifier 1 ($U_{rec1}$) and fed to the switched bridge 2 wherein it is modulated with the HF pulse signals provided by controller 5 via control signals $C_{2a}$-$C_{2d}$. The HF pulse signals modulated with amplitude U, $U_{mod}$, is transformed by the regulated HF transformer into a periodical half-wave sinusoid of amplitude $U_c$, by periodically and smoothly changing the reactive resistance of HFERV 3 between its maximal and minimal resistance values, thereby obtaining a pulsating signal $U_{tran}$ having a desired waveform (e.g., sinusoidal). The pulsating signal $U_{tran}$ is then rectified by rectifier 6 which yields a uni-polar periodic signal $U_{rec2}$. The output of rectifier 6 is then polarized by switched bridge 7, namely, the polarity of one or more half-waves of $U_{rec2}$ are periodically inverted, thus obtaining a periodically alternating signal $U_{out}$.

As will be appreciated the regulated transformation devices of the invention exemplified hereinabove can provide effective protection against short circuit currents, as may occur during startup. This protection is preferably provided by designing the control logic to set the reactive resistance of the HFEVR(s) into a high resistance state during a preset time period after activation of the regulated transformation device.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for transforming and/or regulating a periodic electrical source signal comprising: generating a modulated signal by modulating with said source signal a periodic alternation signal having a time period smaller than the time period of said source signal; generating a transformed regulated signal by transforming and concurrently regulating the modulated signal; generating a combined signal by rectifying the transformed regulated signal; and generating a periodic alternating output signal by periodically inverting polarization of portions of said combined signal, wherein said transformed regulated signal is regulated by continuously adjusting reactive resistance of an electromagnetic voltage regulating device.

2. A method according to claim 1, wherein the transformed regulated signal is generated utilizing a high frequency transformer and a high frequency electromagnetic voltage regulator(s) connected to at least one of the coils of said high frequency transformer, and wherein regulation is carried out by continuously adjusting the reactive resistance of said high frequency electromagnetic voltage regulator(s).

3. The method according to claim 1, further comprising generating a rectified voltage signal by rectifying the source signal, and wherein the modulated signal is generated by modulating the periodic alternating signal with said rectified voltage signal.

4. The method according to claim 1, wherein the regulation of the transformed regulated signal is performed via a closed loop control scheme in which the reactive resistance of the high frequency electromagnetic voltage regulator(s) is continuously adjusted according to a measured value of the transformed and regulated voltage signal.

5. The method according to claim 2, wherein the transformed regulated signal is regulated concurrently by a first high frequency electromagnetic voltage regulator serially connected to a primary coil of the high frequency transformer by a secondary high frequency electromagnetic voltage regulator serially connected to a secondary coil of the high frequency transformer.

6. The method according to claim 1, wherein the periodic alternating output signal is a sinusoidal signal.

7. A transformation device comprising: a modulator for modulating a periodical alternating signal by signal of a power source; a regulated transformer for transforming and regulating the signal outputted from said modulator, wherein said regulated transformer consists of a transformer where at least one coil of which is serially connected to an electromagnetic voltage regulator; an additional rectifier for rectifying the signal outputted by said regulated transformer; a switched bridge for periodically inverting polarization of portions of the signal outputted by said additional rectifier; and control logic for providing suitable control signals for operating said modulator, said switched bridge and said electromagnetic voltage regulator; wherein said regulating is carried out by continuously adjusting the reactive resistance of said electromagnetic voltage regulator.

8. The transformation device according to claim 7, wherein the transformer is a high frequency transformer and the electromagnetic regulator is a high frequency electromagnetic voltage regulator.

9. The transformation device according to claim 7, wherein the regulated transformer comprises two electromagnetic regulators, one of which is serially connected to the primary coil of the transformer, and second of which is serially connected to the secondary coil of said transformer.

10. The transformation device according to claim 7, wherein the control logic is realized by a controller.

11. The transformation device according to claim 7, wherein the modulator is realized by a switched bridge.

12. The transformation device according to claim 7, wherein the switched bridge(s) are realized utilizing MOSFETs.

13. The transformation device according to claim 7, further comprising a rectifier, wherein the signal of the power source is provided to the switched bridge via said rectifier.

14. A transformation device comprising: a modulator for modulating a periodical alternating signal by a voltage signal of a power source; a regulated transformer for transforming and regulating the signal outputted from said modulator, wherein said regulated transformer consists of a transformer comprising a primary coil and two secondary coils each of which connected to an electromagnetic voltage regulator; two additional rectifiers for rectifying the voltage signals outputted via said secondary coils of said regulated transformer; two switching devices, each of which connected to an output of said additional rectifiers for controlling connection of said additional rectifiers to a load; and control logic for providing suitable control signals for operating said modulator, said switching devices and said electromagnetic voltage regulators; wherein said regulating is carried out by continuously adjusting the reactive resistance of said electromagnetic voltage regulator.

15. The transformation device according to claim 14, wherein the modulator is realized by a switched bridge.

16. The transformation device according to claim 15, wherein the switching devices and/or the switched bridge are realized utilizing MOSFETs.

17. A regulator comprising: an electromagnetic voltage regulator serially connected to a load; a first switching device serially connected to said electromagnetic voltage regulator and a first diode serially connected to said load for delivering current thereto from a power source in one direction; and a second switching device serially connected to said load and a second diode serially connected to said electromagnetic voltage regulator for delivering current thereto from said power source in the opposite direction; an additional switching device connected in parallel to said electromagnetic voltage regulator and load for preserving continuous current flow therein while said first and second switching devices are in a disconnecting state; and control logic for providing suitable control signals for operating said first and second switching devices, said switching device and said electromagnetic voltage regulator; wherein regulating is carried out by continuously adjusting the reactive resistance of said electromagnetic voltage regulator.

18. The regulator according to claim 17, wherein two additional switching devices are connected in parallel to said electromagnetic voltage regulator and load each of which is adapted to preserve continuous current flow through the load in a specific direction.

19. The regulator according to claim 17, wherein the switching devices are realized utilizing MOSFETs.

* * * * *